No. 800,035. PATENTED SEPT. 19, 1905.
B. R. VAN KIRK.
CAR TRUCK.
APPLICATION FILED APR. 13, 1903.
2 SHEETS—SHEET 2.
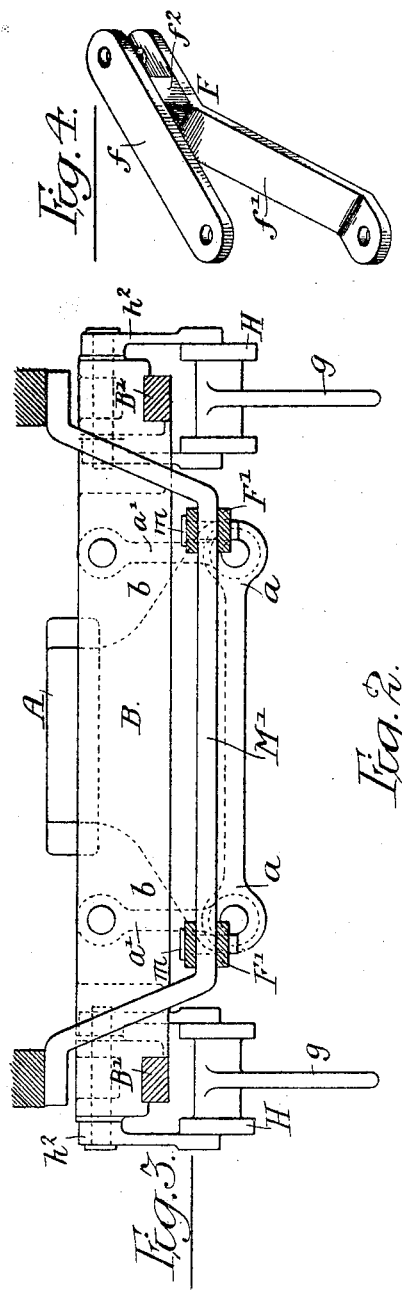
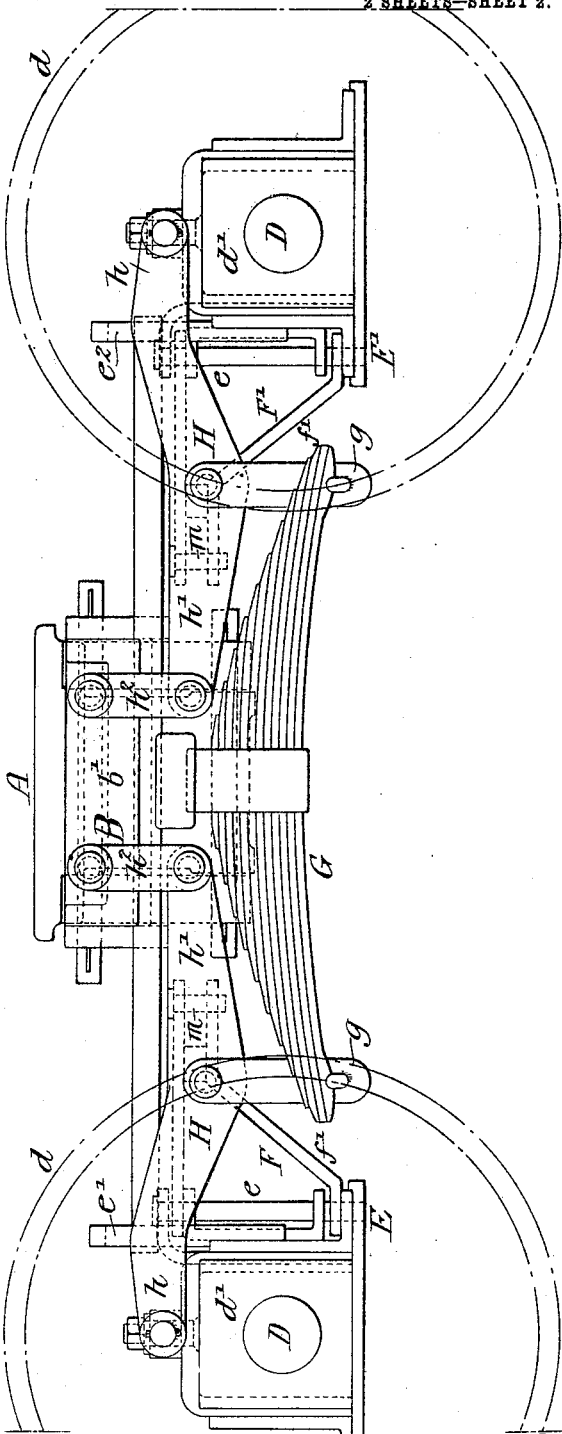
Witnesses:
Titus H. Irons.
Frank L. A. Graham.
Inventor.
Benjamin R. Van Kirk
by his Attorneys, Howson & Howson

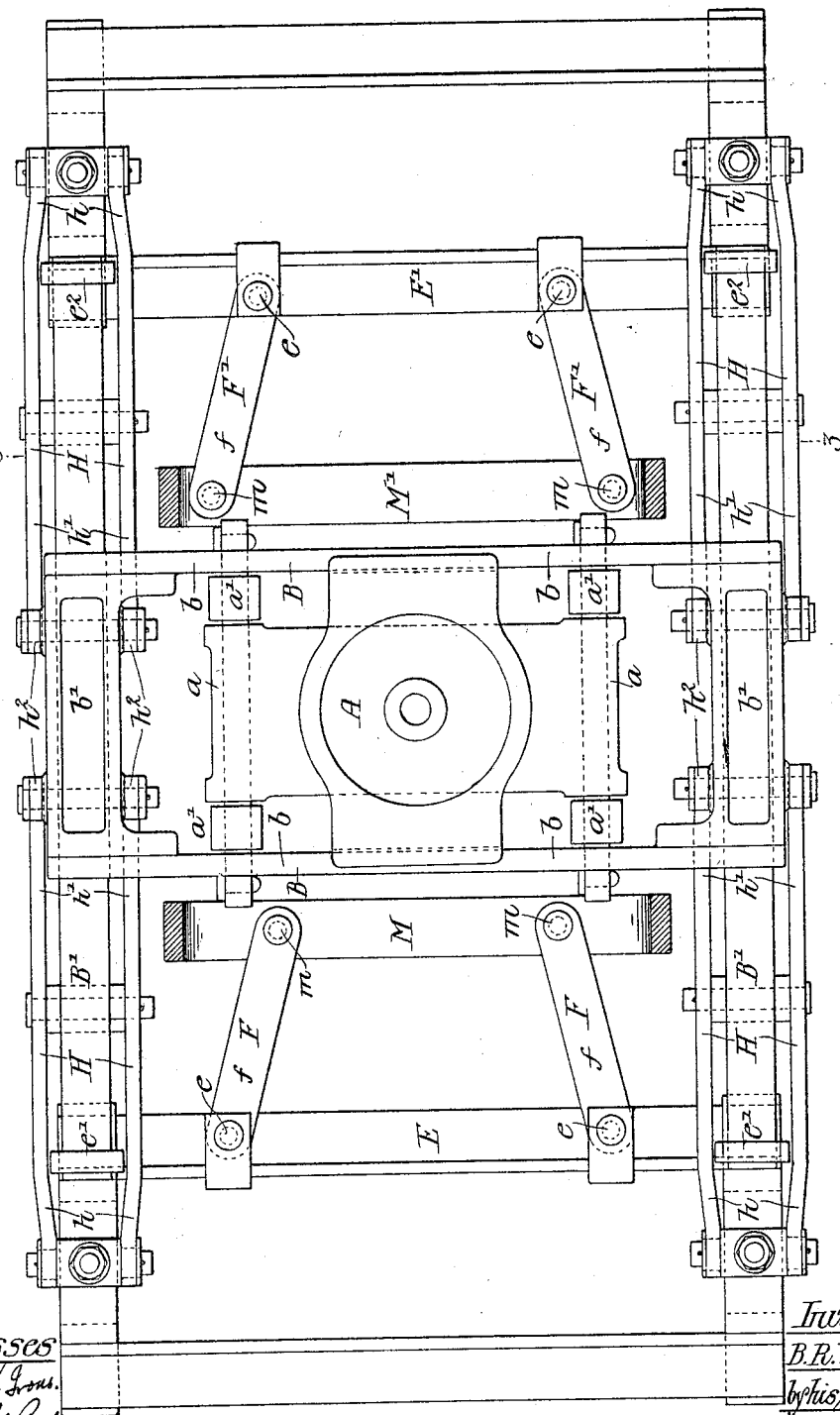

UNITED STATES PATENT OFFICE.

BENJAMIN RUSSELL VAN KIRK, OF PHILADELPHIA, PENNSYLVANIA, ASSIGNOR TO BURNHAM, WILLIAMS & COMPANY, OF PHILADELPHIA, PENNSYLVANIA, A FIRM.

CAR-TRUCK.

No. 800,035.        Specification of Letters Patent.        Patented Sept. 19, 1905

Application filed April 13, 1903. Serial No. 152,394.

*To all whom it may concern:*

Be it known that I, BENJAMIN RUSSELL VAN KIRK, a citizen of the United States, residing in Philadelphia, Pennsylvania, have invented certain Improvements in Car-Trucks, of which the following is a specification.

My invention relates to certain improvements in four-wheel swing-trucks used either under cars or locomotives.

The object of my invention is to allow each axle of the truck to assume a radial position in passing around curves and to provide a simple and efficient equalizing-gear. The truck is pivoted to the car or locomotive body, and one portion of the equalizing-gear for each axle is attached to the body of the car or locomotive and the other to a frame carrying the axle.

In the accompanying drawings, Figure 1 is a plan view of my improved truck, the cross-beams, which are connected to the body of the car or locomotive, being in section. Fig. 2 is a side view. Fig. 3 is a transverse section on the line 3 3, Fig. 1; and Fig. 4 is a perspective view of one of the radius-bars.

A is the swing-bolster, carrying the center-plate, which is pivoted to the body of the car or locomotive by a center pin in the usual manner. Surrounding this swing-bolster is a frame B, consisting of two cross ties or bars $b\ b$, extending from one side of the truck to the other, and end sections $b'$, which are attached to the cross-ties, as clearly shown in Fig. 1. The swing-bolster A is connected to the frame B by links $a'$. The links are hung on rods carried by projections $a\ a$ of the bolster A, as clearly shown in Fig. 3.

E E' are two frames which in the present instance are made as shown in the drawings and carry boxes $d'$, in which are mounted the axles D D. On these axles are mounted the wheels $d$.

Depending from the main frame of the car or locomotive are cross-beams M M', one on each side of the frame B, and extending from the frame to the cross-beam M are radius-bars F, which are shown clearly in Fig. 4. Each radius-bar has in the present instance two members $f\ f'$, connected by a block $f^2$, and a single pin $e$ connects each radius-bar with the frame E, and a pin $m$ connects each radius-bar with the cross-beam M. The frame E' is connected to the cross-beam M', projecting from the car or locomotive body by radius-bars F' of the same construction as the radius-bars F and coupled in the same manner.

Secured to each side of the frame B is a bar B'. These bars extend through guides $e'$ on the frames E E', the openings in the guides being of sufficient size to allow the axle-frames E E' to assume a radial position when passing around curves.

The equalizing mechanism consists of a spring G at each side of the truck, having its central strap resting under the end of the truck-frame B and its ends connected to links $g\ g$, which are coupled to levers H H. One arm $h$ of each lever rests upon one of the boxes $d'$ of an axle, while the other arm $h'$ is connected by a link $h^2$ to the end members $b'$ of the truck-frame. The levers H are mounted one on each side of the longitudinal bars B' of the truck-frame and are connected together by through-pins.

By the above construction it will be seen that when the wheels of the truck take the curve the body of the car or locomotive will swing in such a manner as to cause the axle-frames E E' to assume a radial position, owing to the fact that the said frames are connected to the beams M M', which are connected to the car or locomotive body, and as soon as the truck is traveling on straight tracks the frames E E' assume the position indicated in the drawings. Each of the frames E E' allows of an independent motion not only in respect to the other frame, but also to the truck-frame, and the load is supported by the axles through the frames E E', equalizing-levers H, springs G, and main frame B, which is connected by the link $a$ to the bolster A.

While I have shown a swing-bolster in connection with my improved truck, it will be understood that a rigid-center truck-frame may be used, in which a bearing for the center pin is rigidly secured to the cross-ties of the frame.

I claim as my invention—

1. The combination in a four-wheel truck, of the main frame of a locomotive or car, a truck-frame, two axles, a frame for each axle, radius-bars connecting said frames to the main frame, and bars carried by the truck-frame and guided by the axle-frames, substantially as described.

2. The combination in a four-wheel swing-bolster truck, of a main frame, a swing-bolster, a truck-frame, links connecting the bolster with the truck-frame, two axles, a frame for each axle, radius-bars connecting each frame with the main frame, and bars carried by the truck-frame and guided by the axle-frames, substantially as described.

3. The combination of a main frame, a truck-frame, two axles, a frame for each axle, radius-bars connecting the axle-frames to the main frame of the locomotive or car, an equalizing-gear on each side of the truck and so connected to the two axle-frames that the axle-frames will have independent movement, substantially as described.

4. The combination of a main frame, a truck-frame, two axles, a frame for each axle, radius-bars connecting the frames with the main frame, equalizing mechanism on each side of the truck consisting of a central spring bearing against the bolster, two levers, links connecting the two levers with the bolster, the opposite ends of the levers bearing on the boxes of the axles, and links connecting the ends of the spring with the levers, substantially as described.

5. The combination of a bolster, a truck-frame, links connecting the bolster with the truck-frame, two axles, boxes therefor, independent frames for each axle in which the boxes are mounted, a pair of radius-bars connecting each frame with the main frame of the locomotive or car, bars secured to each side of the truck-frame and extending through guides on the axle-frames, equalizing-levers having one end bearing upon an axle-box, links connecting the other ends of the levers to the truck-frame, links suspended from about the center of the said levers and supporting the ends of a spring, the center of the spring bearing against the under side of the truck-frame, substantially as described.

In testimony whereof I have signed my name to this specification in the presence of two subscribing witnesses.

BENJAMIN RUSSELL VAN KIRK.

Witnesses:
WILL. A. BARR,
JOS. H. KLEIN.